(12) United States Patent
Sato

(10) Patent No.: US 6,169,949 B1
(45) Date of Patent: Jan. 2, 2001

(54) CONTROL APPARATUS OF AUTOMATIC TRANSMISSION FOR VEHICLE AND CONTROL METHOD OF AUTOMATIC TRANSMISSION FOR VEHICLE

(75) Inventor: Kazuhiko Sato, Hitachioota (JP)

(73) Assignees: Hitachi, Ltd., Tokyo; Hitachi Car Engineering Co., Ltd., Hitachinaka, both of (JP)

(*) Notice: Under 35 U.S.C. 154(b), the term of this patent shall be extended for 0 days.

(21) Appl. No.: 09/287,136

(22) Filed: Apr. 7, 1999

(30) Foreign Application Priority Data

Apr. 7, 1998 (JP) .................................................. 10-94237

(51) Int. Cl.[7] .................................................. G06F 17/00
(52) U.S. Cl. ................................ 701/51; 701/54; 701/87; 701/94; 477/107; 477/115
(58) Field of Search ........................... 701/51, 54, 87, 701/84, 85, 94, 80; 477/107, 108, 110, 115, 121

(56) References Cited

U.S. PATENT DOCUMENTS 5,558,596 * 9/1996 Adachi et al. ........................ 701/57
6,029,107 * 2/2000 Sato ...................................... 701/58
6,067,494 * 5/2000 Noda et al. ........................... 701/54

FOREIGN PATENT DOCUMENTS 63-57953 3/1988 (JP) .

* cited by examiner

Primary Examiner—William A. Cuchlinski, Jr.
Assistant Examiner—Yonel Beaulieu
(74) Attorney, Agent, or Firm—Evenson, McKeown, Edwards & Lenahan, P.L.L.C.

(57) ABSTRACT

In a vehicle having a continuously variable transmission, a road surface gradient estimation block for calculating a road surface gradient and a target vehicle speed value decision block for deciding a vehicle speed according to the road surface gradient are provided. During a vehicle running, when the road surface gradient becomes larger than a stored judgment value, a target vehicle speed is prepared in accordance with a vehicle speed at a time a road gradient value exceeds over an establishment value, a transmission ratio is controlled to have the target speed. Accordingly, a drive force in response to the road surface gradient can be carried out without a change-over of a transmission mode by a driver himself.

7 Claims, 9 Drawing Sheets

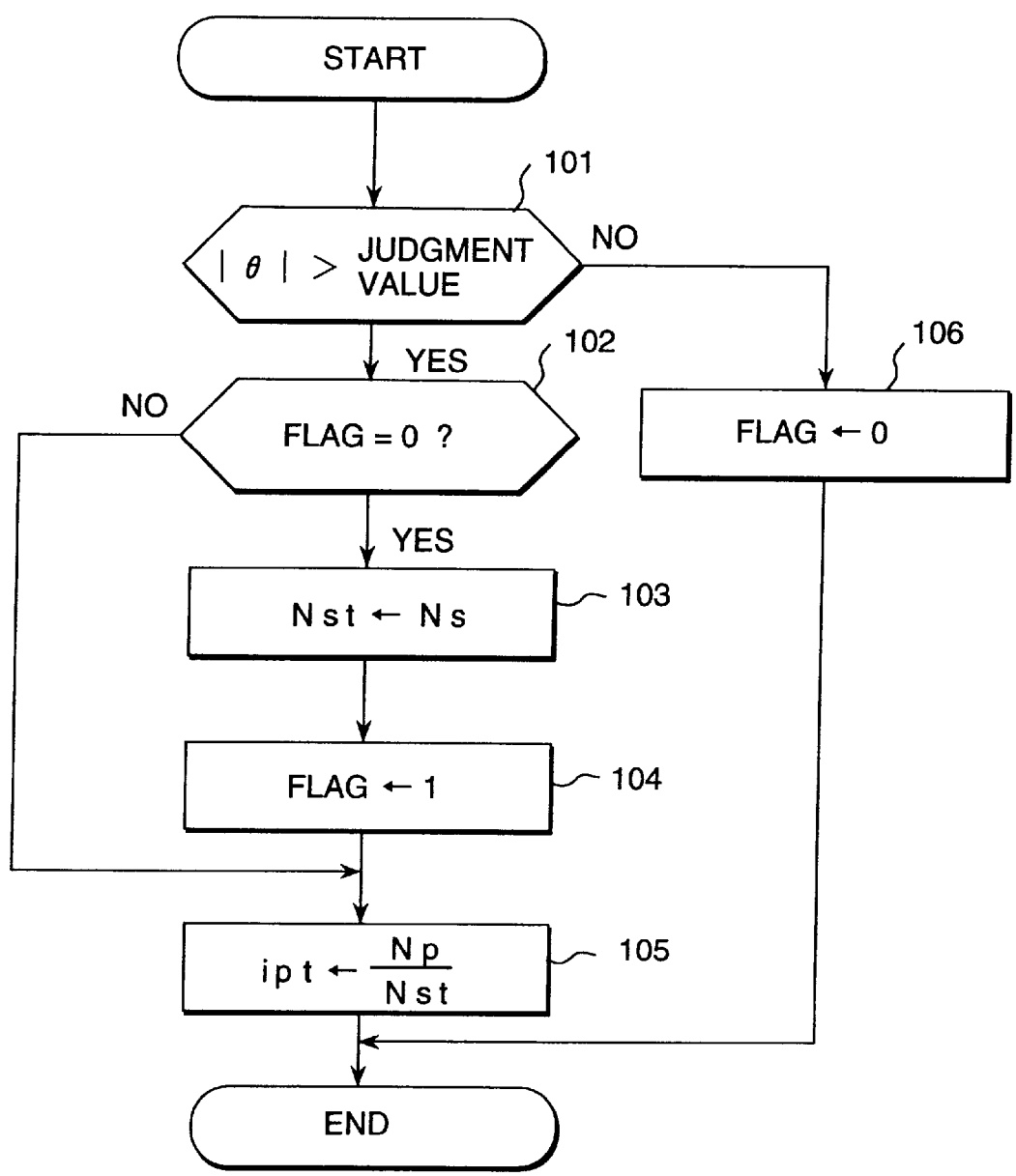

CONTROL APPARATUS OF AUTOMATIC TRANSMISSION FOR VEHICLE AND CONTROL METHOD OF AUTOMATIC TRANSMISSION FOR VEHICLE

BACKGROUND OF THE INVENTION

The present invention relates to a control apparatus in which in particular a continuously variable transmission among automatic transmission for a vehicle s becomes to be as a control subject and a control method thereof, and in particular relates to a control apparatus of an automatic transmission for a vehicle where even a road gradient of a road surface in which a vehicle runs varies, a necessary driving force or an engine brake can be obtained automatically and thereby the vehicle can be run safely and a control method of an automatic transmission for a vehicle.

Up to now, as to a control method of an automatic transmission for a vehicle, for example, as described in Japanese application patent laid-open publication No. Sho 63-57953, one method has been known in which a present transmission ratio (a present pulley ratio) is requested by a pulley ratio between an input side pulley (a primary pulley) and an output side pulley (a secondary pulley) of a continuously variable transmission (CVT) and a rotation number of the pulley and a control of a transmission ratio (a pulley ratio) is controlled to coincide this present transmission ratio (the present pulley ratio) with a target transmission ratio (a target pulley ratio) which is requested according to a state amount of a vehicle which has memorized in advance in a control apparatus, or another method has known in which an input side pulley rotation number is varied to coincide to a target input side pulley rotation number.

Further, it will be explained in concretely, from the target input side pulley rotation number which is requested by a running condition of the vehicle the target transmission ratio (the target pulley ratio) is calculated and a command value for operating a transmission use actuator of an automatic transmission is calculated from the target transmission ratio (the target pulley ratio) and this command value is outputted.

Further, as a control method, a total value of a feed forward loop and a feed back loop is made as a command value of a transmission use actuator, such a feed back loop is calculated a command value according to a proportional and integral execution in which a difference between the target input pulley rotation number and an actual input pulley rotation number is formed as a deviation.

In the above stated prior arts, during a flat road surface running there is no transmission chock different from a vehicle having a stepped stages transmission and the performances such as an acceleration feeing are good, however when there is a road surface gradient, following problems occur.

For example, when the vehicle is on a down hill, a driver returns an acceleration pedal by hoping an engine brake with an aim for lowering a vehicle speed, however in a case of the conventional automatic transmissions a shift-up causes by returning the acceleration pedal and the vehicle speed is increased and the driver is caused to have a consideration which differs from his intention and according to the circumstances the driver may be given an afraid about a fear feeling.

Accordingly, during the down hill the driver carries out frequently a foot brake, however following conditions cause in which by stepping continuously the foot brake the brake oil is boiled and then the brake becomes ineffective or a brake pad is worn early and then the brake becomes ineffective.

As the countermeasures against the above facts, to making effectively the effect of the engine brake during the down hill in the automatic transmission the driver can carries out positively the change-over of a range (a range selection) by the shift-down, as described in a vehicle use explanation. However, there is a report in which the driver who carries out positively the range change-over (the range selection) is few, accordingly it is necessary to carry out a countermeasure using a control method.

Further, when an up hill (a hill climb) continues, when a trample down of the acceleration pedal is not carried out, the vehicle speed lowers naturally. In a case of abrupt climb road gradient, it is necessary to carry out the trample down largely and by this trample down, the shift-down is carried out, accordingly a drive torque is increased.

In the case of the vehicle having the continuously variable transmission (CVT), together with the trample down of the acceleration pedal, the transmission ratio (the pulley ratio) is changed gradually to a low side. However, in the case of the abrupt climb road gradient, it is necessary to carry out the range change-over (the range selection) by the driver and then the driver may be given to feel a nuisance.

On the other hand, in a microprocessor installed in an interior portion of the control apparatus of the automatic transmission, the drive torque and the road surface gradient are estimated and executed from an engine condition amount such as an engine rotation number and a throttle valve opening degree etc. and the transmission ratio is controlled suitably.

As a recently technical tread, in a case of a lean air fuel ratio control engine and a fuel direct injection system engine, due to an increase of the parameters for requesting an output torque and a change in time lapse, the estimation and execution of the drive torque and the road surface gradient becomes complicatedly.

SUMMARY OF THE INVENTION

An object of the present invention is to provide a control apparatus of an automatic transmission for a vehicle wherein a driving force in response to a road surface gradient can be obtained by a driver himself without a change-over of a transmission mode and a control method of an automatic transmission for a vehicle.

Further, in a non-conventional system such as a lean air fuel ratio control engine and a fuel direct injection system engine, a transmission ratio (a pulley ratio) is controlled automatically in response to a road surface gradient, and the transmission ratio can be controlled automatically, in a case of a down hill road gradient a moderate engine brake suited to the road gradient can be obtained and further in case of an up hill (a hill climb) road gradient a moderate drive force suited to the road gradient can be obtained.

According to the present invention, in a control apparatus of an automatic transmission for a vehicle, a command value is calculated in response to an engine rotation number, an input side pulley rotation number of a continuously variable transmission (CVT), and an information indicating a condition of a vehicle such as a vehicle speed of the vehicle and a throttle valve opening degree.

According to the above stated command value a command is inputted, by varying an interval of a V shape groove of an input side pulley (a primary pulley) and an output side pulley (a secondary pulley) and by varying a pulley winding valid radius of a belt which is hung between said both pulleys (the primary pulley and the secondary pulley), a transmission ratio (a pulley ratio) is changed continuously variable and then a transmission control is carried out, the control apparatus has a road gradient estimation block for calculating a road gradient of a running road surface and a target vehicle speed value decision block for deciding a speed of the vehicle in accordance with the road gradient of the road surface, and the transmission ratio (the pulley ratio) is controlled to have the vehicle speed having a constant value under a basis of the vehicle speed when the vehicle is on at the road gradient.

Further, the road gradient estimation block receives the information for indicating the engine condition from a control apparatus of the engine and this road gradient estimation block comprises a torque calculation block for estimating the drive torque of the vehicle, a running load resistance calculation block for calculating the running load resistance under a basis of the vehicle speed, and an acceleration torque calculation block for calculating the acceleration torque of the vehicle according to the vehicle.

With the above stated means, a target value of the vehicle speed is requested in accordance with the stimulation torque taking into in addition to the executed torque, the running resistance, and the acceleration torque and the vehicle is controlled by requesting the most suitable transmission ratio (pulley ratio) to follow an actual vehicle speed. As a result, in the case of the down hill road gradient the suitable engine torque can be obtained and further in the case of the up hill road gradient the suitable driving force against the road gradient can be obtained.

BRIEF DESCRIPTION OF DRAWINGS

FIG. 7 is a control flow chart of the first embodiment of a control apparatus of an automatic transmission for a vehicle and a control method of an automatic transmission for a vehicle according to the present invention;

DESCRIPTION OF THE INVENTION

Hereinafter, a control apparatus of an automatic transmission for a vehicle and a control method of an automatic transmission for a vehicle of various embodiments according to the present invention will be explained referring to drawings.

Figure 1:
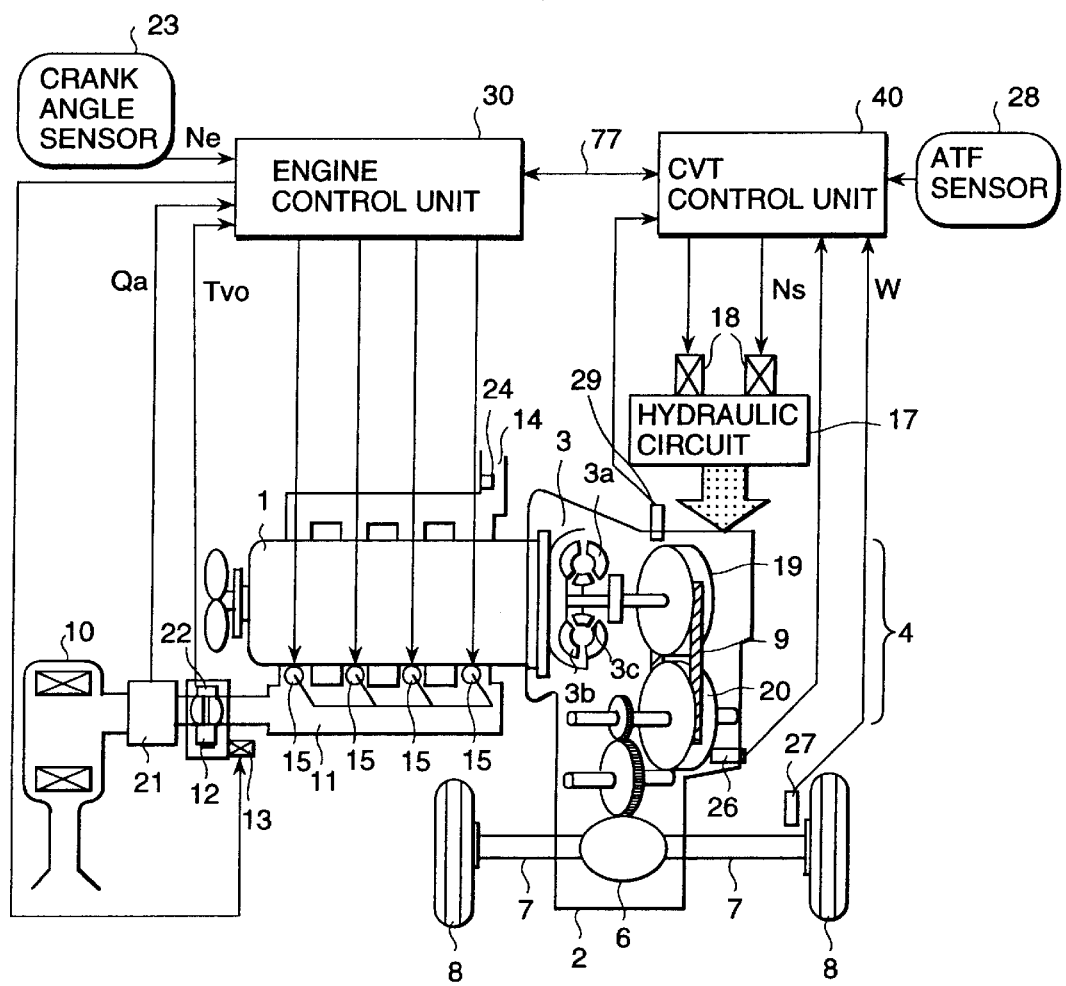
FIG. 1 is a system construction view showing a power train which comprises an engine of a vehicle and a continuously variable transmission CVT of one embodiment of a control apparatus of an automatic transmission for a vehicle and a control method of an automatic transmission for a vehicle according to the present invention.

FIG. 1 is a system construction view showing a portion of a power train which comprises an internal combustion engine of a vehicle and a continuously variable transmission (hereinafter, it is called as CVT).

In FIG. 1, the vehicle comprises an internal combustion engine 1, an air cleaner 10 for cleaning and unifying the air which is inhaled by the engine 1, an air intake conduit 11 for leading the cleaned and purified air by the air cleaner 10 to the engine 1, a throttle valve 12 for adjusting an air mount which passed through the air intake conduit 11, an acceleration pedal 16 for operating a valve opening degree of the throttle valve 12, an exhaust air pipe 14 for leading an exhaust air from the engine 1 to an outside portion.

The vehicle comprises further an oxygen sensor 24 for detecting an oxygen concentration in the exhaust gas, a fuel injector 15 for injecting the fuel in a respective cylinder of the engine 1, a continuously variable transmission CVT 2 coupled to an output shaft of the engine 1, driving wheels 8 to which a driving force from the engine 1 is transmitted, a drive shaft 7 for driving the driving wheel 8, a differential gear 6 for connecting a propel shaft 5 and a drive shaft 7, an engine control unit 30 for controlling the engine 1, and a continuously variable transmission CVT control unit 40 for controlling the continuously variable transmission CVT 2, and a respective control unit 30 and a respective continuously variable transmission CVT control unit 40 are connected mutually to a local area network LAN 77.

The continuously variable transmission CVT 2 has a torque converter 3 which is connected directly to the output shaft of the engine 1 and a continuously variable transmission mechanism 4 which is connected directly to an output shaft of the torque converter 3. The torque converter 3 has a pump 3*a* which is connected directly to the output shaft of the engine 1 and a stator 3*c* which is provided between the pump 3*a* and a turbine 3*b* through an oil material.

The continuously variable transmission CVT mechanism 4 comprises a primary pulley 19 which is an input side pulley and receives the driving force from the torque converter 3, a secondary pulley 20 which is an output side pulley and is positioned oppositely to the primary pulley 19, and a metal belt 9 for transmitting the driving force to the secondary pulley 20 from the primary pulley 19.

The transmission control (the shift control) is carried out by varying the transmission ratio (the pulley ratio) to make continuously variable, namely a V shape groove interval between the primary pulley 19 and the secondary pulley 20 is varied and a pulley winding effective radius of the belt 9 which is hang between the primary pulley 19 and the secondary pulley 20 is varied.

The move of the primary pulley 19 and the secondary pulley 20 is carried out by operating a hydraulic cylinder (not shown in figure) by the oil pressure which is supplied by a hydraulic pressure circuit 17. Further, since the oil pressure is changed by the temperature, in the hydraulic pressure circuit 17 an automatic transmission fluid ATF sensor 28 for detecting the oil pressure temperature is provided.

The rotation number of the primary pulley 19 is detected according to a primary rotation sensor 25 for detecting a primary rotation number Np which is the rotation number of the primary pulley 19 and further the rotation number of the secondary pulley 29 is detected according to a secondary rotation sensor 26 for detecting a secondary rotation number Ns which is the rotation number of the secondary pulley 20. Since the rotation of the secondary pulley 20 is transferred to the driving wheel 8 through the differential gear 6, the secondary rotation number Ns is proportional to the vehicle speed.

To the air intake conduit 11, an air flow sensor 21 is provided and detects an air flow amount (an air flow value) Qa of the air which passes through the air intake conduit 11. To the throttle valve 12, a throttle valve opening degree sensor 22 is provided and detects a throttle valve opening degree Tvo which expresses the opening degree of the throttle valve 12.

The acceleration pedal 16 and the throttle valve 12 are mechanically linked with in this embodiment according to the present invention, when an operation amount of the acceleration pedal 16 is zero (0), the throttle valve opening degree Tvo becomes zero (0). Accordingly, the detection of the throttle valve opening degree Tvo corresponds to the indirect detection of the operation amount of the acceleration pedal 16.

Even when the throttle valve opening degree Tvo is zero (0), to maintain an idling condition, a bypass conduit (not shown in figure) is provided to the air intake conduit 11 and through this bypass conduit the rare air is supplied to the engine 1. An idle speed valve 13 adjusts the above stated air flow amount Qa. To a crank shaft (not shown in figure) which is an output shaft of the engine 1, a crank angle sensor 23 is provided and detects an engine rotation number Ne which is the rotation number of the engine 1. To a suspension not shown in figure, a vehicle weight sensor 27 is provided and detects an actual vehicle weight.

The engine control unit 30 carries out controls the fuel injector 15, the idle speed valve 13 and an ignition circuit not shown in figure in response to the information from the air flow sensor 21, the throttle valve opening degree sensor 22, an oxygen sensor 24, and a continuously variable transmission CVT control unit 40. Further, the continuously variable transmission CVT control unit 40 carries out a control of a transmission operation valve (a shift valve) 18 in response to the information from the primary rotation sensor 25, the secondary rotation sensor 26, the vehicle weight sensor 27, the ATF sensor 28 and the engine control unit 30.

Figure 5:
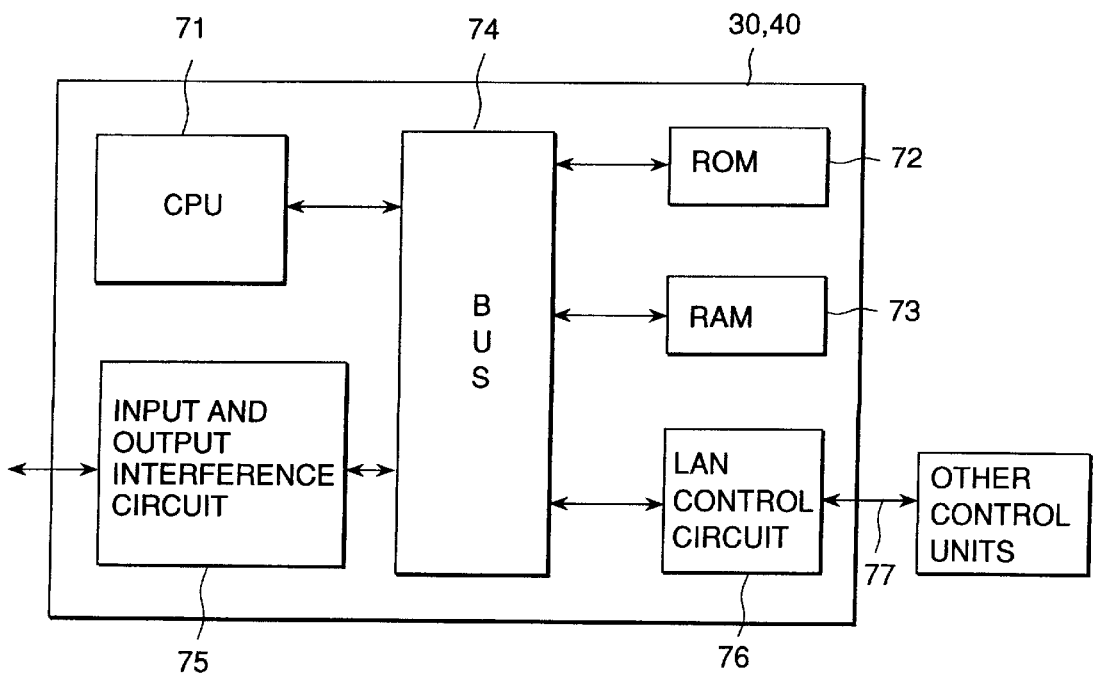
FIG. 5 is a construction view showing an engine control unit 30 or a continuously variable transmission CVT control unit 40 of one embodiment of a control apparatus of an automatic transmission for a vehicle and a control method of an automatic transmission for a vehicle according to the present invention.

FIG. 5 is a construction view of the engine control unit 30 or the continuously variable transmission CVT control unit 40. The above stated the engine control unit 30 or the continuously variable transmission CVT unit 40 has a central processing unit 71 (hereinafter, it is called as CPU) for carrying out various kinds executions, a read-only memory 72 (hereinafter, it is called as ROM) for carrying out the execution by CPU 71, a random access memory 73 (hereinafter, it is called as RAM) in which the data is stored temporarily.

The above stated the engine control unit 30 or the continuously variable transmission CVT unit 40 further has an input and output interference circuit 75 for receiving the signals from the various kinds sensors and for outputting the signals to the various valves of the transmission operation valve (the shift valve) 18 etc. and the actuators, a local area network control circuit 76 (hereinafter, it is called as LAN control circuit) for carrying out the transfer of the data between the engine control unit 30 and the continuously variable transmission CVT control unit 40, and a bus 74 for connecting to carry out enable mutually for the transfer of the data between these above stated various elements.

Figure 2:
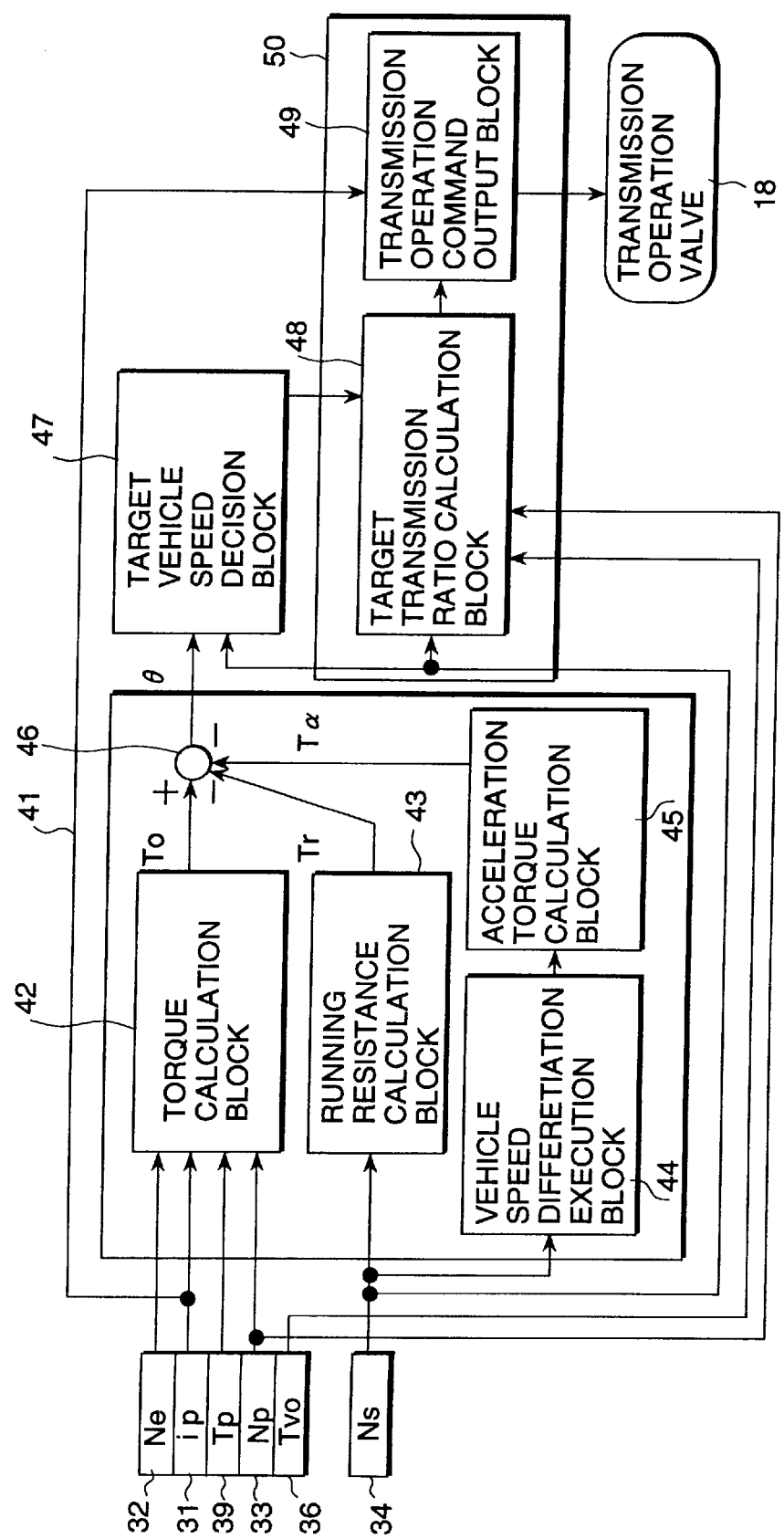
FIG. 2 is a control block diagram of a first embodiment of a control apparatus of an automatic transmission for a vehicle and a control method of an automatic transmission for a vehicle according to the present invention and the control block diagram showing a control software which is executed in a continuously variable transmission CVT control unit 40.

With the hardware construction of the above stated engine control unit 30 and the continuously variable transmission CVT control unit 40, the software construction shown in FIG. 2 is practiced. FIG. 2 shows a control apparatus of an automatic transmission for a vehicle and a control method of an automatic transmission for a vehicle of a first embodiment according to the present invention and FIG. 2 shows a control block diagram of the control software which is carried out in the continuously variable transmission CVT control unit 40.

The input variables are the engine rotation number Ne 32, the primary pulley rotation number Np 33, the secondary pulley rotation number NS 34, a pulley ratio ip 31 which is a rate of the primary pulley rotation number Np 33 and the secondary pulley rotation number Ns 34, the throttle valve opening degree Tvo 36, and a fuel basic injection pulse width data Tp 39 which receives from the engine control unit 30 according to a LAN communication line.

As shown in FIG. 2, a block 4 includes a torque calculation block 42 for requesting a drive shaft torque To of the continuously variable transmission CVT 2 shown in FIG. 1, a running resistance calculation unit 43, a vehicle speed differentiation execution block 44, an acceleration torque calculation block 45 and then a road surface gradient $\theta$ is requested.

Next, as shown in FIG. 2, in a target vehicle speed value decision block 47, the vehicle speed when the road surface gradient $\theta$ becomes larger than a value of an advanced establishment road surface gradient has stored, and in accordance with the above stated vehicle speed the target vehicle speed is decided.

In the target transmission ratio calculation block 48 in a block 50, the target transmission ratio is calculated in accordance with the target vehicle speed which is decided in the target vehicle speed value decision block 47, the secondary pulley rotation number Ns 34 which indicates a present vehicle speed, the primary pulley rotation number Np 33, and the throttle valve opening degree Tvo 36, and the calculated target transmission ratio is compared with the pulley rotation ratio ip 31 which indicates a present actual transmission ratio.

In a transmission ratio operation command output block 49 an operation amount of the transmission operation valve (the shift valve) 18 is outputted. In this block 50 is a common continuously variable transmission CVT transmission ratio proportion unit of the conventional continuously variable transmission CVT.

Figure 3:
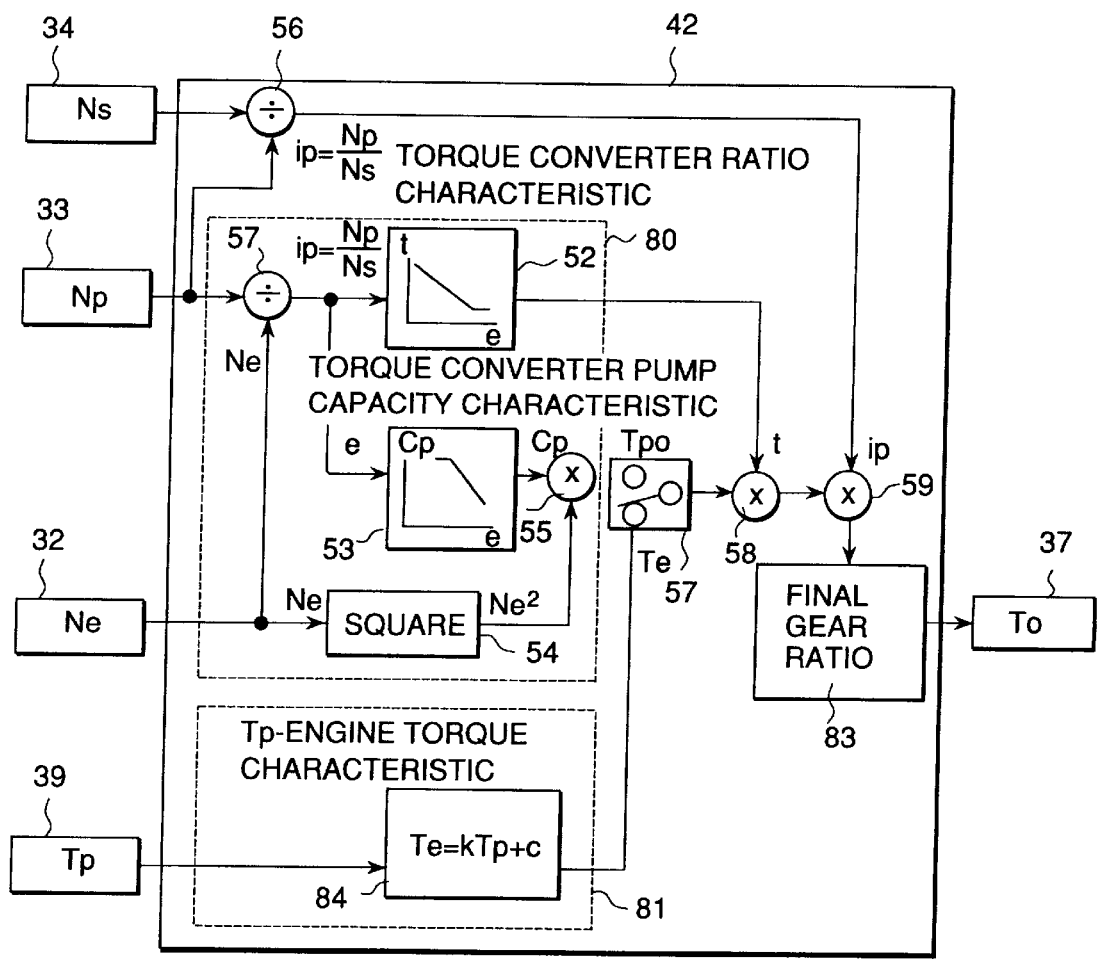
FIG. 3 is s control block diagram showing a detailed construction of a torque calculation block 42 shown in FIG. 2.

Next, FIG. 3 is a detailed control block diagram of the torque calculation block 42 shown in FIG. 2.

The input signals are the engine rotation number Ne 32, the primary pulley rotation number Np 33, the secondary pulley rotation number Ns 34, and the fuel basic injection pulse width data Tp 39. In FIG. 2, the pulley rotation ratio ip 31 is indicated as the input signal, since the pulley rotation ratio ip 31 is requested in accordance with the primary pulley rotation number Np 33 and the secondary pulley rotation number Ns 34, in FIG. 3, the pulley rotation ratio ip 31 is requested in the torque calculation block 42.

An essential portion of the torque calculation block 42 is comprised of a torque converter characteristic block 80 and the fuel basic injection pulse width data Tp—an engine torque characteristic block 81.

In a block 57 of the torque converter characteristic block 80, a ratio Np/Ne between the primary pulley rotation number Np 33 and the engine rotation number Ne 32 is requested. This obtained ratio forms a pulley ratio (a speed ratio) e of the torque converter.

In a torque converter ratio characteristic block 52, using a stored pulley ratio e of the torque converter—a torque ratio curve line, a torque ratio t of the torque converter is requested by the pulley ratio e. Further, in a torque converter pump capacity characteristic block or an input capacity characteristic block 53, using a stored pump capacity coefficient curve line or a stored input capacity coefficient curve line of the torque converter, a pump capacity coefficient Cp of the torque converter is requested by the pulley ratio e.

In a block 54, the engine rotation number Ne 32 is multiplied, and in a block 55 a pump torque Tpo of the torque converter is requested by multiplying the squared engine rotation number $Ne^2$ to the pump capacity coefficient Cp which is calculated in the torque converter pump capacity characteristic block 53.

In a block 84 in the fuel basic injection pulse width data Tp—the engine torque characteristic block 81, using the stored fuel basic injection pulse width data Tp 39 and a torque characteristic of the engine torque Te, the engine torque Te is requested.

Next, in a block 57, the pump torque Tpo or the engine torque Te is selected. As to this selection condition, for example, a standard value against the pulley ratio e is provided, and when the pulley ratio e is smaller than the standard value the pump torque Tpo is selected, on the other hand when the pulley ratio e is larger than the standard value the engine torque Te is selected.

In a case of the combination in which the pump torque Tpo which is requested by the pump capacity coefficient Cp of the torque converter and the pulley ratio e are large, and when the pulley ratio e is large on the pump capacity coefficient curve line of the torque converter which is stored in the torque converter pump capacity characteristic block 53, the pump capacity coefficient Cp becomes small and accordingly an affect of the execution error becomes large.

In particular, in a condition where the torque converter presents to a be a lockup, the error becomes large, as a result an acute pump torque Tpo can not be requested. Therefore, in a case where the pulley ratio e is large, the engine torque Te is selected.

In a block 58, a turbine torque Tt which is a torque of the output shaft side of the torque converter is calculated by multiplying the selected pump toque Tpo or the selected engine torque Te to the torque ratio t. This turbine torque Tt is the torque which corresponds to the input torque of the continuously variable transmission CVT 2 shown in FIG. 1.

In a block 59, the drive shaft torque To 37 of the continuously variable transmission CVT 2 is calculated by multiplying the turbine torque Tt to the pulley rotation ratio ip and further multiplying a final gear ratio or a final reduction ratio in a block 83.

Next, a method for requesting the road surface gradient θ will be explained referring to the block 41 shown in FIG. 2.

The drive shaft torque To is indicated by an addition value of a flat ground running load resistance torque Tr, an acceleration resistance torque $T_\alpha$, and a road gradient torque $T_\theta$. Accordingly, the road gradient torque $T_\theta$ is expressed by a following formula (1).

$$T_\theta = To - Tr - T_\alpha \quad (1)$$

In the block 41 shown in FIG. 2, the road gradient torque $T_\theta$ is requested from the drive shaft torque To which is calculated by the torque calculation block 42, and from the flat road load resistance torque Tr which is calculated by the running load resistance calculation block 43, the acceleration resistance $T_\alpha$ which is requested by the vehicle speed differentiation execution block 44 and the acceleration torque calculation block 45. In the block 46, the road surface gradient θ is requested in accordance with the following executions.

The flat road running load resistance torque Tr, the acceleration resistance torque $T_\alpha$, and the road gradient torque $T_\theta$ are expressed according to following formulas (2), (3) and (4), respectively.

$$Tr = (\mu r \times W + ka \times V^2) \times Pt \quad (2)$$

$$T_\alpha = (W \times Wr) \times \alpha \times Rt/g \quad (3)$$

$$T_\theta = W \times \sin\theta \times Rt \quad (4)$$

Herein, $\mu r$ is a rolling friction resistance coefficient, W an actual vehicle weight, ka air resistance coefficient, V vehicle speed, Rt a radius of tire, Wr rotation inertia weight, α acceleration velocity, and g gravity acceleration velocity.

Firstly, from the formula 2 and the formula 3, the flat road running load resistance torque Tr and the acceleration resistance torque $T_\alpha$ are requested, from the drive shaft torque To which is requested by the torque calculation block 42, the flat road running load resistance torque Tr and the acceleration resistance torque $T_\alpha$ are subtracted and then the road gradient torque $T_\theta$ is requested. And substituting this requested road gradient torque $T_\theta$ for the formula 4, the value sin θ of the road gradient is requested, and then the road surface gradient θ can be requested.

Figure 4:
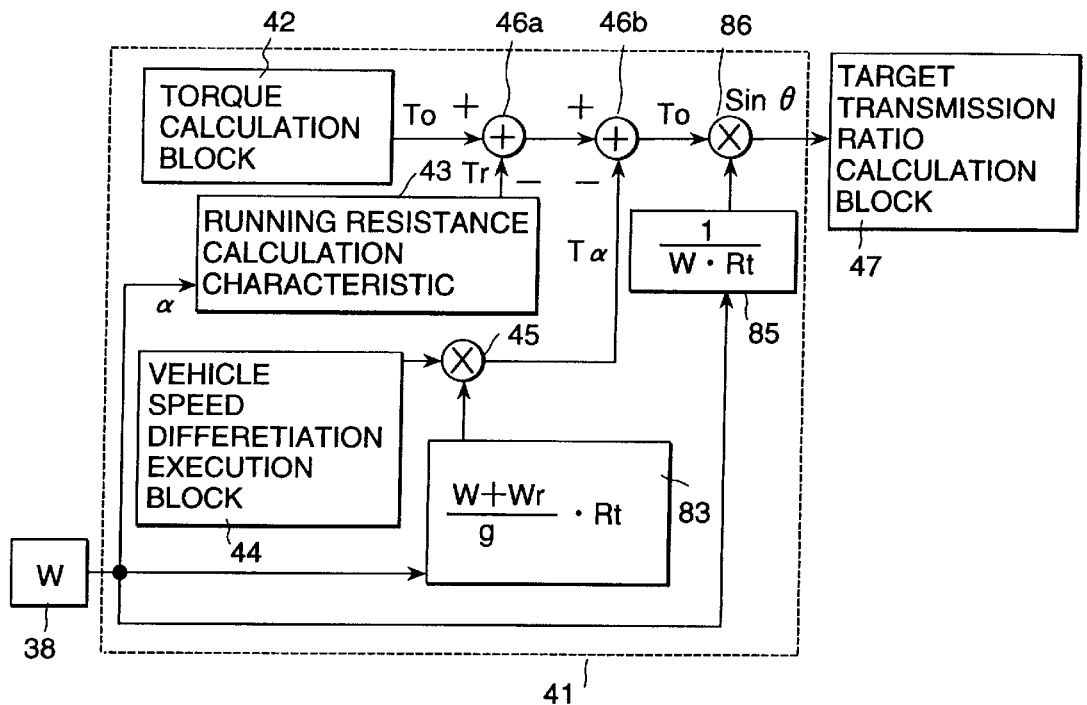
FIG. 4 is a control block diagram showing a detailed construction of a block 41 shown in FIG. 2.

FIG. 4 is a control block diagram showing a detailed construction of the block 41 shown in FIG. 2. The input signals are the same shown in FIG. 1 and are omitted in FIG. 4. Further, in the actual vehicle weight W 28, the signal which is detected by the vehicle weight sensor 27 shown in FIG. 1 can be made as the input signal or the input signal can be stored in advance in the acceleration torque calculation block 45 etc. shown in FIG. 2.

In FIG. 4, in the running load resistance calculation block 43, from the vehicle speed V which is requested by the actual vehicle weight W 38 which is detected by the vehicle weight sensor 27 shown in FIG. 1 and the secondary pulley rotation number Ns 34 which is detected in the secondary rotation sensor 26, in accordance with the above stated formula 2, the flat road running torque Tr is requested.

Next, in the acceleration torque calculation block 45, the acceleration velocity α which is requested in the vehicle speed differentation execution block 44 is squared to a value which is requested in the block 84, in accordance with the above stated formula 3, the acceleration torque $T_\alpha$ is requested.

Further, from the drive shaft torque To which is requested in the torque calculation unit 42, in a block 46a the flat road running load resistance Tr is subtracted, in a block 46b the acceleration resistance torque $T_\alpha$ is subtracted, accordingly then the road gradient torque $T_\theta$ is requested. Further, in the block 85 and in the block 86, in accordance with the formula 4, the road gradient sin θ is requested. The road gradient sine or the converted road surface gradient θ is sent to the target vehicle speed value decision block 47.

Further, as stated in the above, herein against the vehicle weight sensor 27 is provided to obtain the vehicle weight W, in a motor car (an automobile) in which the change in the vehicle weight W is not large compared with the truck, the standard vehicle weight W may be stored in advance, for example, such a vehicle weight W in which two persons ride on.

Further, in place of the detection of the vehicle weight w by means of the vehicle weight sensor 27, under the condition in which the road surface gradient θ and the drive shaft torque To are not varied, the vehicle weight W can be estimated according to the vehicle speed V at some time and the change of the vehicle speed V at a time after the some time lapses.

Further, as to the acceleration velocity α, the secondary pulley rotation number Ns which is detected by the secondary rotation sensor 26 is performed with the differential execution by the time, and the acceleration velocity a can be obtained, however by providing an acceleration sensor to a vehicle body then the acceleration velocity α may be obtained directly.

Figure 6A:
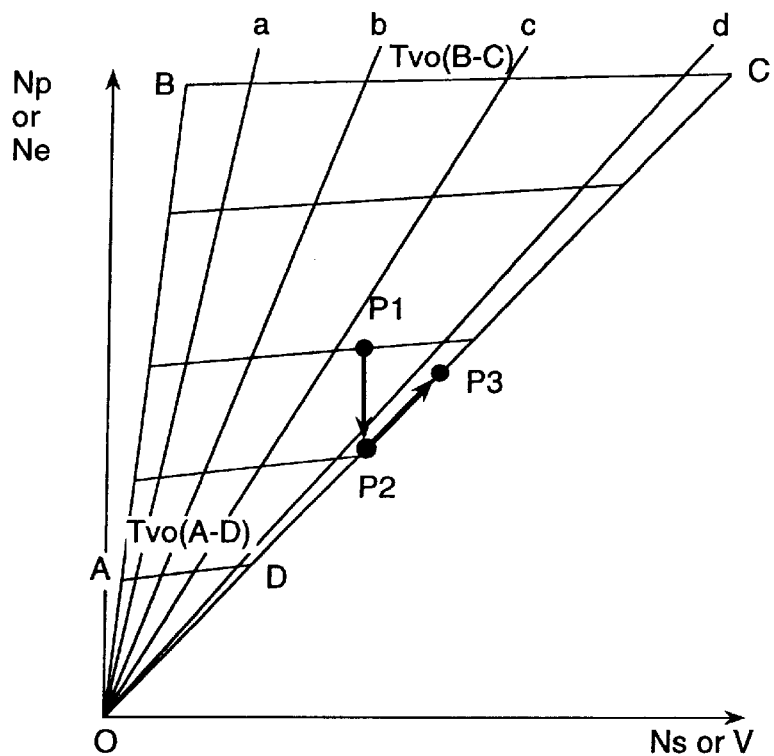
FIG. 6A is a transmission schedule characteristic line view showing a continuously variable transmission CVT according the prior art.

Next, the control of the automatic transmission for a vehicle of the above stated embodiment according to the present invention will be explained referring to FIG. 6B and FIG. 7. FIG. 6A is a control of the automatic transmission for a vehicle according to the prior art.

Figure 6B:
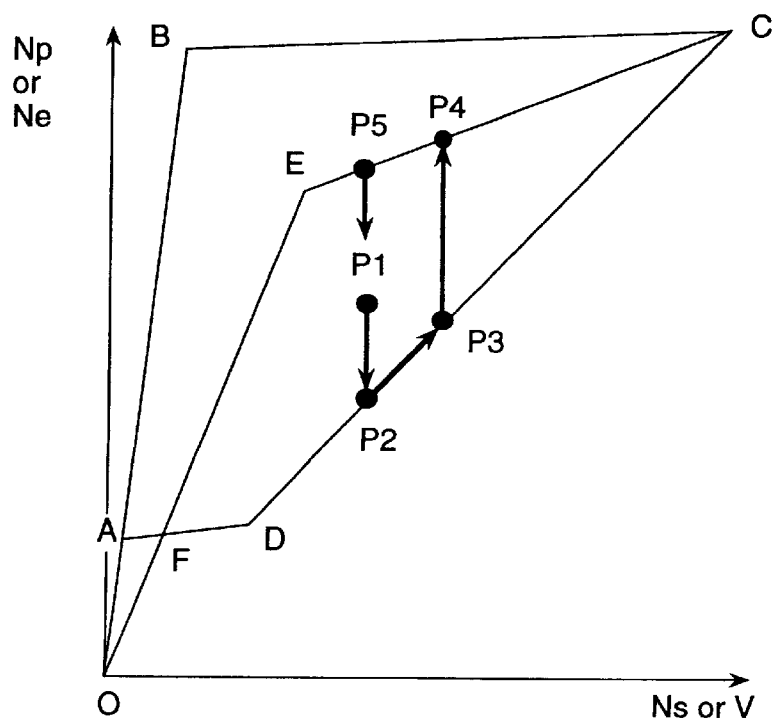
FIG. 6B is a transmission schedule characteristic line view of a first embodiment of a control apparatus of an automatic transmission for a vehicle and a control method of an automatic transmission for a vehicle according to the present invention.

FIG. 6B is a general transmission schedule characteristic line of the continuously variable transmission CVT 2 shown in FIG. 1. As a horizontal axis the vehicle speed V or the secondary pulley rotation number Ns is indicated, and as a vertical axis the primary pulley rotation number Np or the engine rotation number Ne is indicated.

FIG. 6A is the transmission schedule characteristic line of the continuously variable transmission CVT according to the prior art. As a horizontal axis the vehicle speed V or the secondary pulley rotation number Ns is indicated, and as a vertical axis the primary pulley rotation number Np or the engine rotation number Ne is indicated.

In the prior art technique shown in FIG. 6A, a target primary pulley rotation number Npt which is a control target is requested in accordance with the throttle valve opening degree Tvo (A-D) . . . , Tvo (B-C) and the vehicle speed V.

Herein, differing from the stepped stage transmission, however in the continuously variable transmission CVT, the transmission ratio, namely the pulley rotation ratio ip in the prior art is expressed only few plural linear lines, for example four lines, (0-a, 0-b, 0-c, 0-d, etc.) which pass through an original point zero (0).

On the other hand in the present invention, in addition to the plural linear lines which pass through an original point zero (0) but it has a feature that it can obtain any place within a range A-B-C-D-A, namely it can obtain a numberless linear line which passes through an original point zero (0).

Further, in the continuously variable transmission CVT 2 in the embodiment according to the present invention and according to the prior art, a liner line 0-A-B indicates the most large portion of the transmission ratio and it is impossible to take the transmission ratio (the pulley ratio) more than the above stated transmission ratio.

FIG. 6B is the transmission schedule characteristic line in the case of this embodiment according to the present invention. An area enclosed by a line A-B-C-E-F-A is an area which in common is called a sport mode etc., and this is set to has the high engine rotation number Ne against to some vehicle speed V. In this sport mode, at an area enclosed by a line C-E-F-D-C the vehicle is not operated.

Now, it is supposed a case where the vehicle is on the down hill having a large road gradient. From a requirement for effecting the engine brake to restrain an increase of the vehicle speed, the driver operates to return the step-in of the acceleration pedal or separate completely his foot from the acceleration pedal and then the throttle valve opening degree Tvo is directed to become a full-closing condition or a throttle valve shutting condition.

In the transmission schedule characteristic line shown in FIG. 6A according to the prior art, when the normal running time is a point p1 and when the throttle valve opening degree Tvo becomes the full-closing condition or the throttle valve shutting condition and then the operation point transfers to a point p2. The transmission ratio, provisionally, is shown the transmission ratio in the stepped stage transmission, since it is made to become small in proportional to from the linear line 0-a to the linear line 0-d, the transmission ratio is made to be an over-top, regardless the requirement of the engine brake the engine brake is not effected, then the vehicle speed is increased more and more directing for a direction of an operation point p3.

On the other hand, according to the control method of the automatic transmission for a vehicle of this embodiment according to the present invention, since the driver can change over the modes shown in FIG. 6B, it is possible to obtain fully the engine brake. Namely, when the vehicle is on the down hill, the driver can separate his foot from the acceleration pedal then the throttle valve opening degree Tvo is made to present the full-closing condition or the throttle valve shutting condition. The operation point transfers from the point p1 to the point p2, and in proportion to the increase in the vehicle speed the operation point move to the point p3.

Herein, when the driver changes over the sport mode, the operation pint transfers from the point p3 to a point p4 and the transmission ratio (the pulley ratio) becomes large, accordingly the engine brake can be obtained and the increase in the vehicle speed can be restrained. According to the above embodiment according to the present invention, it is possible to carry out automatically the change-over of the transmission schedule in the down hill.

The driver who is not gotten skillful about the drive can not carry out easily the above stated positive range change-over and since such a driver can not be obtained the necessary engine brake force, the driver carries out frequently the foot brake and runs down the down hill. In a case of the long length down hill, since the drive steps in continuously the foot brake, a brake face is heated and a brake liquid is boiled and then the foot brake can not be effect and there is a possibility to reach an accident.

As a result, according to the control method and the control apparats of the automatic transmission for a vehicle of this embodiment according to the present invention, the vehicle speed V which is recognized as the down hill is memorized as the target vehicle speed Vt and the pulley rotation ratio ip is controlled to become this target vehicle speed Vt as the actual vehicle speed. In FIG. 6B, when the operation point transfers from the point p1 to the point p2, the vehicle speed at the point p2 is made to have the target vehicle speed Vt. Next, to maintain the above stated target vehicle speed Vt the primary pulley rotation number Np is varied, and the pulley rotation ratio ip is control to be a point p5.

FIG. 7 shows a flow chart of the above stated control of the automatic transmission for the vehicle of this embodiment according to the present invention. For the simplification for the explanation, the flow chart is shown after the condition of the road surface gradient θ is requested. Further, each of the up hill road gradient and the down hill road gradient is judged according to one constant as the judgment value.

In FIG. 7, in a block 101, the road surface gradient θ which is obtained in the block 41 is compared with the judgment value of the road surface gradient which is stored in advance in the memory etc. When the road surface gradient θ is judged as larger than the judgment value, it proceeds to a block 102, however when the road surface gradient θ is judged as smaller than the judgment value, it proceeds to a block 106.

In the block 102, it judges whether a flag is zero (0) or not. When this flag is zero (0), it means that the road surface gradient θ exceeds at first the judgment value. When the flag is zero (0), it proceeds to a block 103 and the present secondary pulley rotation number Ns is stored in the memory as a target secondary pulley rotation number Nst. And in a block 104, a value of the flag is made to be one (1).

Next, from the present primary pulley rotation number Np and the target secondary pulley rotation number Nst, in accordance with a following formula 5, a target pulley rotation ratio ipt is requested.

$$ipt = Np/Nst \quad (5)$$

In accordance with the target pulley rotation ratio (the target transmission ratio) ipt, an operation amount to the transmission operation valve (the shift valve) 18 is decided in a transmission operation command output unit 40 shown in FIG. 2 and as a result the transmission operation (the shift operation) is carried out.

Next, in the block 102, when the flag is not zero (0), jumping over the block 103 and the block 104, in a block 105 the target pulley rotation ratio ipt is calculated. In the block 101, when the road surface gradient θ is smaller than the judgement value, the flag is reset to be zero (0), jumping over the block 103, the block 104, and the block 105, this control is finished. The above stated control of the automatic transmission for the vehicle of this embodiment according to the present invention can be corresponded to any one of the up hill road gradient and the down hill road gradient in accordance with the same principle.

A control apparatus of a vehicle use transmission and a method of a automatic transmission for a vehicle of a second embodiment according to the present invention will be explained referring to FIG. 8. Similar to FIG. 2, FIG. 8 is a control block diagram of a control software which is carried out in the continuously variable transmission CVT control unit 40.

Figure 8:
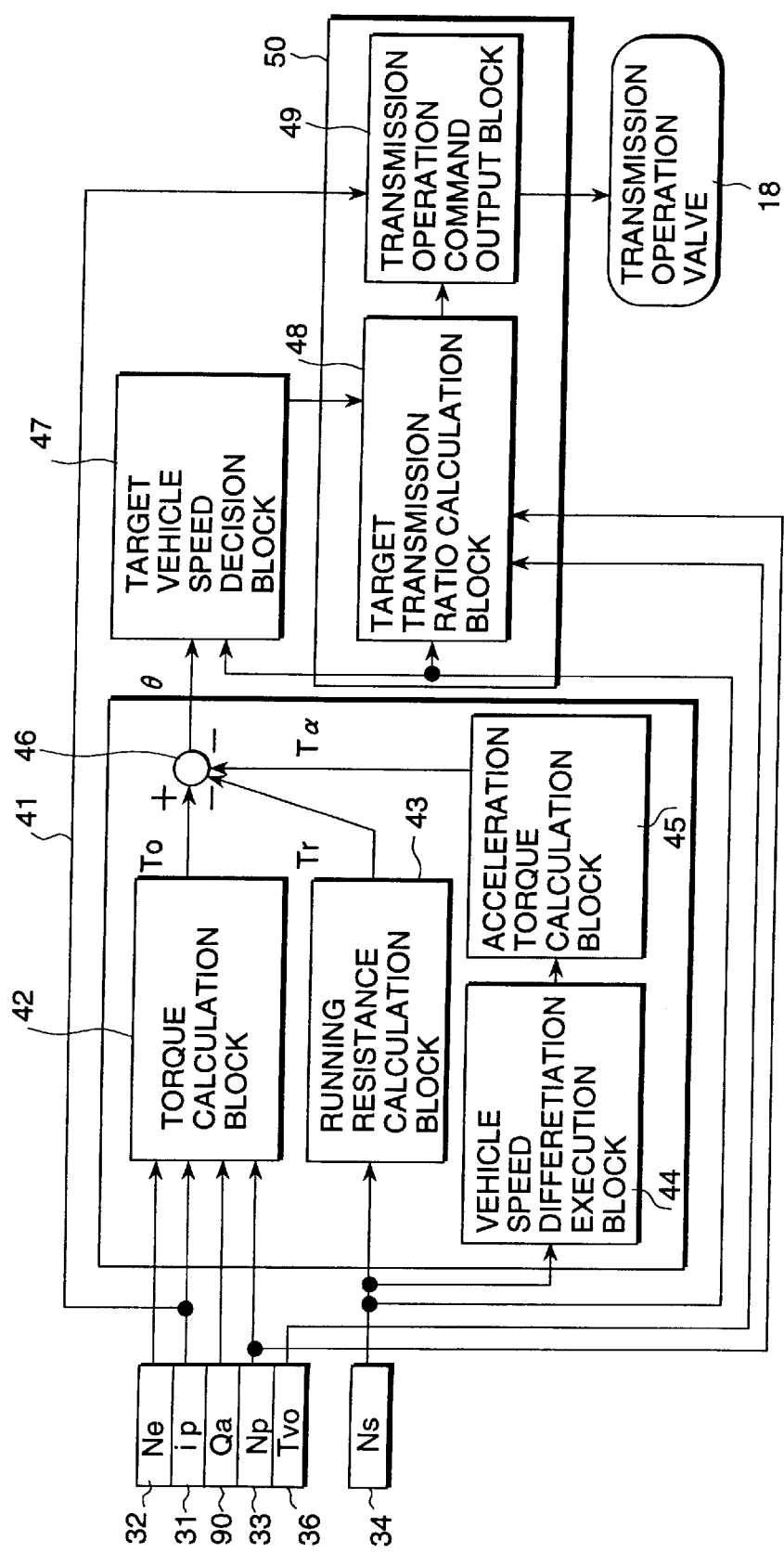
FIG. 8 is a control block diagram of a second embodiment of a control apparatus of an automatic transmission for a vehicle and a control method of an automatic transmission for a vehicle according to the present invention and the control block diagram showing a control software which is executed in a continuously variable transmission CVT control unit 40.

Compared with the control block diagram shown in FIG. 2, the control diagram shown in FIG. 8 has a difference about only a signal which is inputted to the torque calculation block 42. Namely, in place of the fuel basic injection pulse width data Tp 39, in FIG. 8 an engine inhale air amount Qa 90 is inputted. This signal is sent from the engine control unit 31 through LAN 77 shown in FIG. 1.

Figure 10:
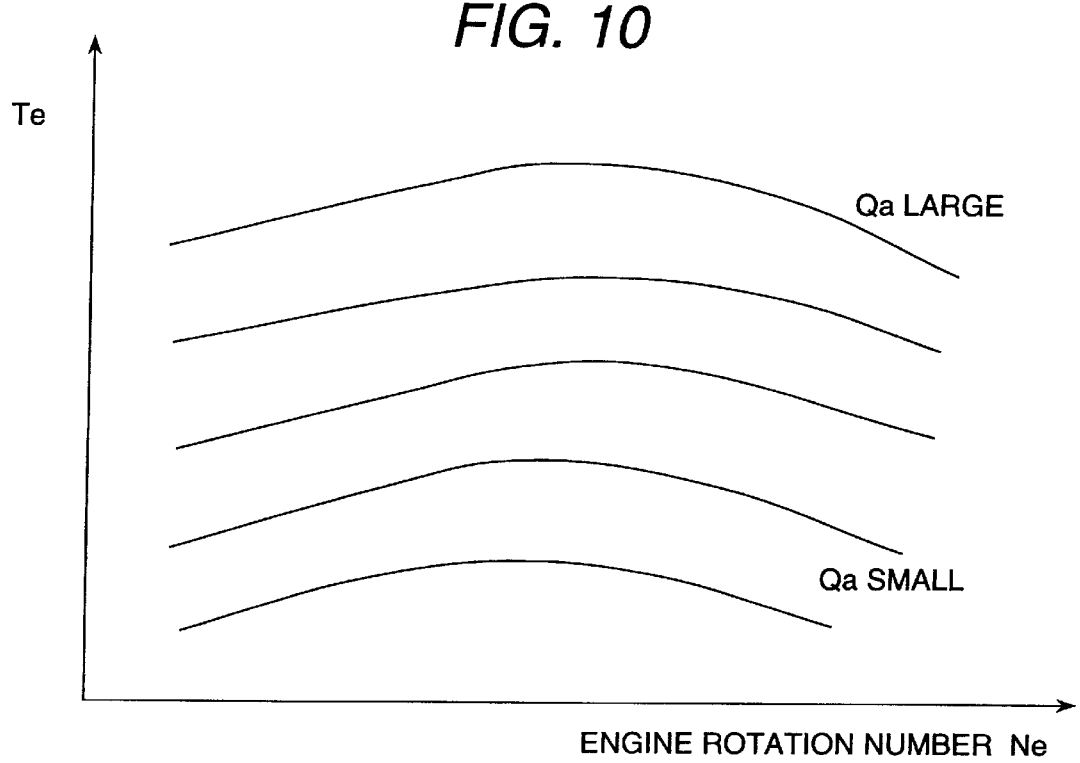
FIG. 10 is an air flow amount Qa—an engine torque characteristic view of the second embodiment according to the present invention.

In the torque calculation block 42 shown in FIG. 8, the fuel basic injection pulse width data Tp—the engine torque characteristic stored in the block 84 of FIG. 3 which is the detailed figure of the torque calculation block 42 shown in FIG. 2 is placed to the engine inhale air amount Qa—the engine torque characteristic shown in FIG. 10. Other executions except for the above are similar to those of FIG. 2. In place of the fuel basic injection pulse width data Tp 39, even using the engine inhale air amount Qa 90 the road surface gradient can be estimated.

A control apparatus of a vehicle use transmission and a control method of an automatic transmission for a vehicle of a third embodiment according to the present invention will be explained referring to FIG. 9. Similar to FIG. 2, FIG. 9 is a control block diagram of a control software which is carried out in the continuously variable transmission CVT control block 40.

Figure 9:
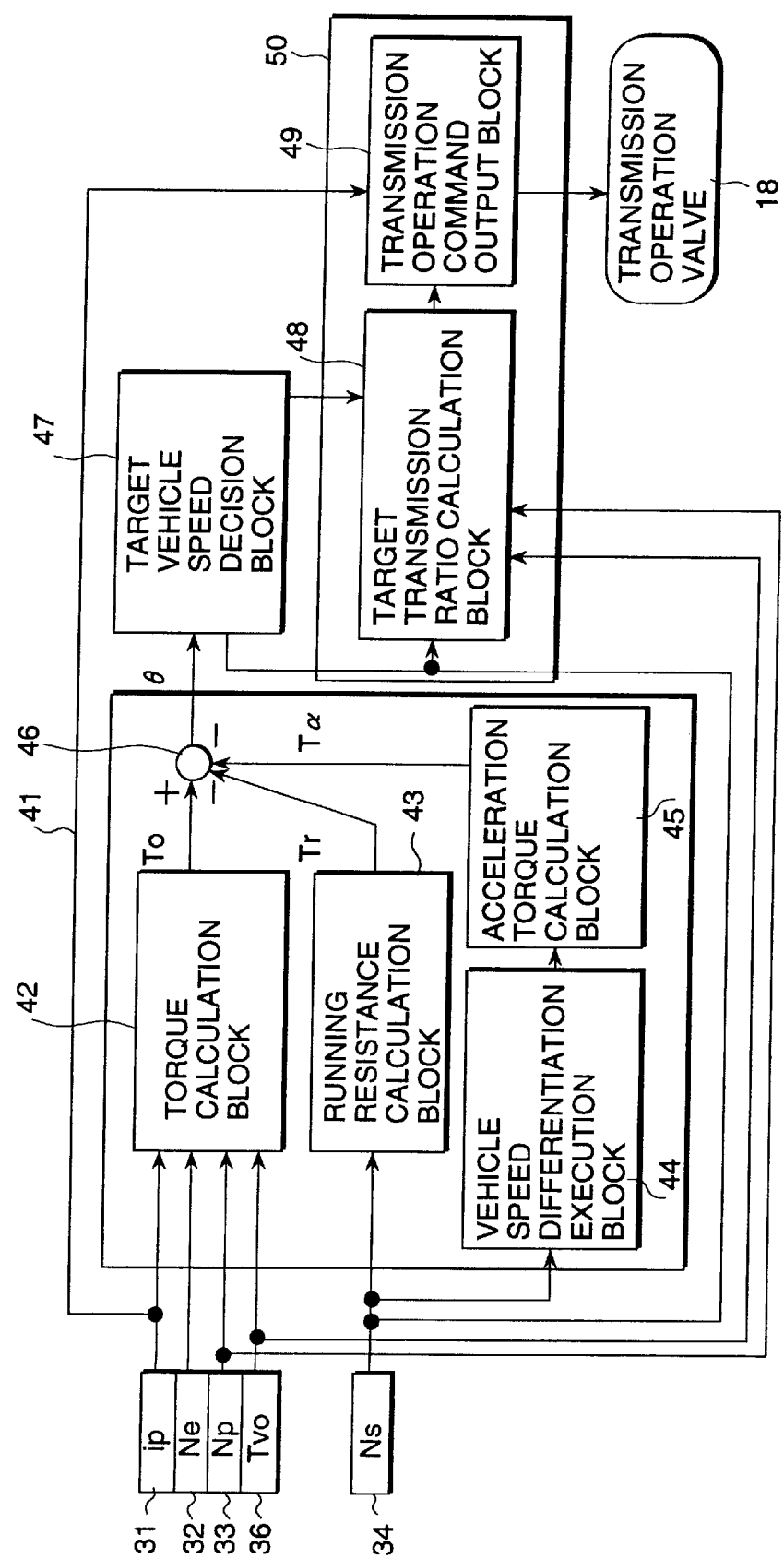
FIG. 9 is a control block diagram of a third embodiment of a control apparatus of an automatic transmission for a vehicle and a control method of an automatic transmission for a vehicle according to the present invention and the control block diagram showing a control software which is executed in a continuously variable transmission CVT control unit 40.

Compared with the control block diagram shown in FIG. 2, the control diagram shown in FIG. 9 has a difference about only a signal which is inputted to the torque calculation block 42. Namely, the control diagram shown in FIG. 9 has no fuel basic injection pulse width data Tp 39 shown in FIG. 2.

Figure 11:
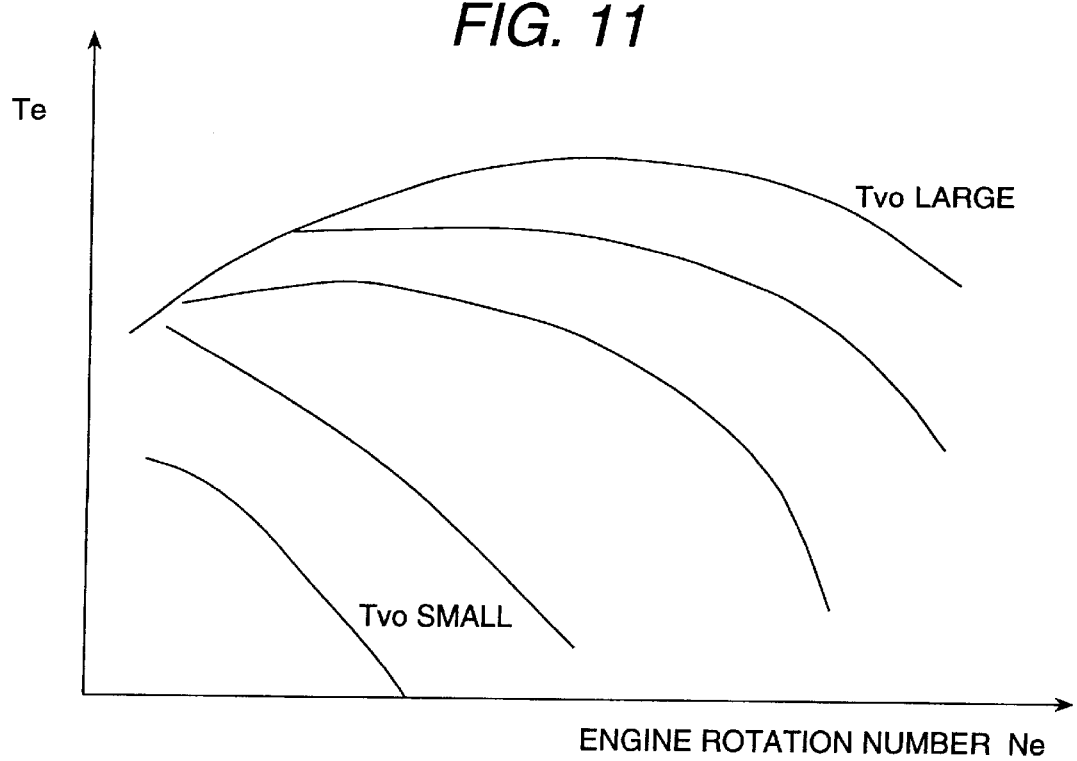
FIG. 11 is a throttle valve opening degree Tvo—an engine torque characteristic view of the third embodiment according to the present invention.

In the torque calculation block 42 shown in FIG. 9, the fuel basic injection pulse width data Tp—the engine torque characteristic stored in the block 84 of FIG. 3 which is the detailed figure of the torque calculation block 42 shown in FIG. 2 is placed to the throttle valve opening degree Tvo—the engine torque characteristic shown in FIG. 11. Other executions except for the above are similar to those of FIG. 2. In place of the fuel basic injection pulse width data Tp 39, even using the throttle valve opening degree Tvo the road surface face gradient can be estimated.

According the above stated control apparatus of the automatic transmission for the vehicle and the control method of the automatic transmission for the vehicle of the various embodiments according to the present invention, in addition to the executed torque, from the estimation torque taking under the consideration of the running resistance and the acceleration torque, the target value of the vehicle speed is requested, then the vehicle speed is controlled by requesting the optimum transmission ratio to follow the actual vehicle speed.

As a result, without the driver himself carries out the change-over the transmission range, in the case of the down hill road gradient the suitable engine brake can be obtained and further in the case of the up hill road gradient the suitable drive force against to the road gradient can be obtained.

Further, even in the case of the engine which is not the conventional system engine such as the lean burn air fuel ratio control engine and the fuel direct injection system engine, the transmission ratio (the pulley ratio) is controlled in accordance with the drive shaft torque, in response to the road face condition, the transmission ratio can be controlled automatically.

In the case of the down hill road gradient the suitable engine brake can be obtained and further in the case of the up hill road gradient the suitable drive force against to the road gradient can be obtained, accordingly the transmission ratio can be controlled automatically.

As stated in the above, according to the control apparatus of the automatic transmission for the vehicle and the control method of the automatic transmission for the vehicle according to the present invention, the drive force response to the road surface gradient can be obtained without the changeover operation of the transmission mode by the driver himself.

What is claimed is:

1. In a control apparatus of an automatic transmission mounted on a vehicle for transmitting an output of an engine to driving wheels through a torque converter and the automatic transmission, in response to a condition of the vehicle comprised of at least a state of said engine and a condition of said automatic transmission a command value is calculated, and in accordance with said calculated command value a command is outputted, and a shift control for varying a continuously a transmission ratio of said automatic transmission is carried out, the control apparatus of the automatic transmission for the vehicle comprises wherein
  a road gradient estimation block for calculating a road gradient of a road surface on which said vehicle runs in accordance with an input side rotation member rotation number and an output side rotation member rotation number of said automatic transmission and an engine condition amount indicating the condition of said engine;
  a target vehicle speed value decision block for calculating a target value of a vehicle speed of said vehicle in accordance with said road gradient which is calculated in said road gradient estimation block and said output side rotation member rotation number;
  a target transmission ratio calculation block for calculating a target value of said transmission ratio of said automatic transmission in accordance with said target value of said vehicle speed of said vehicle which is decided in said target vehicle speed value decision block, said input side rotation member rotation number, said output side rotation member rotation number, and a throttle valve opening degree for controlling an air amount which is introduced into said engine; and
  a transmission operation command output block for calculating said command value in accordance with said input side rotation member rotation number, said output side rotation member rotation number, and said target value of said transmission ratio which is calculated in said target transmission ratio calculation block.

2. A control apparatus of an automatic transmission for a vehicle according to claim 1, wherein
  said target value of said vehicle speed of said vehicle which is decided in said target vehicle speed value decision block is calculated in accordance with said input side rotation member rotation number, said output side rotation member rotation number, said engine state amount, a drive torque which is calculated from said output side rotation member rotation number, a running load resistance which is calculated from said input side rotation member rotation number, and an acceleration torque of the vehicle which is calculated from said output side rotation member rotation number.

3. A control apparatus of an automatic transmission for a vehicle according to claim 1, wherein
  said engine state amount is at least one selected from fuel amount, an inhale air amount which is introduced into said engine, and the throttle valve opening degree of said engine.

4. In a control method of an automatic transmission mounted on a vehicle for transmitting an output of an engine to driving wheels through a torque converter and the automatic transmission, in response to a condition of the vehicle comprised of at least a state of said engine and a condition of said automatic transmission a command value is calculated, and in accordance with said calculated command value a command is outputted, and a shift control for varying a continuously a transmission ratio of said automatic transmission is carried out, the control method of the automatic transmission for the vehicle comprises the steps of,
  calculating a road gradient of a road surface on which the vehicle runs in accordance with an input side rotation member rotation number and an output side rotation member rotation number of said automatic transmission and an engine condition amount indicating the condition of said engine;
  calculating a target value of a vehicle speed of said vehicle in accordance with said calculated road gradient and said output side rotation member rotation number;
  calculating a target value of said transmission ratio of said automatic transmission in accordance with said calculated target value of said vehicle speed of the vehicle, said input side rotation member rotation number, said output side rotation member rotation number, and a throttle valve opening degree for controlling an air amount which is introduced into said engine; and
  calculating said command value in accordance with said input side rotation member rotation number, said output side rotation member rotation number, and said calculated target value of said transmission ratio.

5. A control method of an automatic transmission for a vehicle according to claim 4, wherein
  said target value of said vehicle speed of said vehicle is calculated in accordance with said input side rotation member rotation number, said output side rotation member rotation number, said engine state amount, a drive torque which is calculated from said output side rotation member rotation number, a running resistance which is calculated from said input side rotation member rotation number, and an acceleration torque of the vehicle which is calculated from said output side rotation member rotation number.

6. A control method of an automatic transmission for a vehicle according to claim 4, wherein
  said engine state amount is at least one selected from fuel amount, the inhale air amount which is introduced into said engine, and said throttle valve opening degree of said engine.

7. In a control method of an automatic transmission mounted on a vehicle for transmitting an output of an engine to driving wheels through a torque converter and said automatic transmission, in response to a condition of the vehicle comprised of at least a state of said engine and a condition of said automatic transmission a command value is calculated, and in accordance with said calculated command value a command is outputted, and a shift control for varying a continuously a transmission ratio of said automatic transmission is carried out, the control method of the automatic transmission for the vehicle comprises the steps of,
  detecting a vehicle speed of said vehicle;
  detecting at least one selected from a data of a fuel amount, an inhale air amount which is supplied into said engine, and a throttle valve opening degree of said engine;

detecting a rotation number of an input side rotation member of said automatic transmission and a rotation number of an output side rotation member of said automatic transmission;

calculating an input side torque of said torque converter in accordance with said rotation number of said input side rotation member of said automatic transmission, said rotation number of said output side rotation member of said automatic transmission, and a characteristic of said torque converter;

calculating an engine torque in accordance with a condition amount indicating a condition of said engine and an engine torque characteristic of said engine;

selecting any one of said input side torque and said output side torque in accordance with said detected vehicle speed and calculating a drive shaft torque in accordance with said selected torque value and said characteristic of said torque converter;

calculating a road gradient of a road surface on which the vehicle runs in accordance with said calculated drive shaft torque, said detected vehicle speed of the vehicle, and said detected rotation number of said output side rotation member of said automatic transmission;

deciding a target vehicle speed in accordance with said calculated road gradient; and controlling a transmission ratio of said automatic transmission in accordance with said decided target vehicle speed.

* * * * *